(12) United States Patent
Geng et al.

(10) Patent No.: US 12,099,123 B2
(45) Date of Patent: Sep. 24, 2024

(54) METHODS AND APPARATUS FOR CHARACTERIZING POINT CLOUD DATA FOR AUTONOMOUS VEHICLE SYSTEMS

(71) Applicant: Nuro, Inc., Mountain View, CA (US)

(72) Inventors: Kun Geng, Fremont, CA (US); Frank Cheng, Mountain View, CA (US); Hao Li, San Jose, CA (US); Matthew Jeremy Sarett, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 224 days.

(21) Appl. No.: 17/891,387

(22) Filed: Aug. 19, 2022

(65) Prior Publication Data

US 2023/0119762 A1   Apr. 20, 2023

Related U.S. Application Data

(60) Provisional application No. 63/256,078, filed on Oct. 15, 2021.

(51) Int. Cl.
*B60W 60/00*   (2020.01)
*B60W 50/02*   (2012.01)
*G01S 17/86*   (2020.01)
*G01S 17/89*   (2020.01)
*G01S 17/931*  (2020.01)

(52) U.S. Cl.
CPC ....... *G01S 17/931* (2020.01); *B60W 50/0205* (2013.01); *B60W 60/00* (2020.02); *G01S 17/86* (2020.01); *G01S 17/89* (2013.01); *B60W 2050/021* (2013.01); *B60W 2420/403* (2013.01); *B60W 2420/408* (2024.01)

(58) Field of Classification Search
CPC ........ G01S 17/931; G01S 17/86; G01S 17/89; B60W 60/00; B60W 50/0205; B60W 2420/408; B60W 2050/021; B60W 2420/403
See application file for complete search history.

(56) References Cited

PUBLICATIONS

Kashammer, P.-F et al. "Mirror Identification and Correction of 3D Point Clouds," The International Archives of the Photogrammetry, Remote Sensing and Spatial Information Sciences, vol. XL-5/W4, 2015 3D Virtual Reconstruction and Visualization of Complex Architectures, Feb. 2015, 6 pages.
(Continued)

*Primary Examiner* — Mathew Franklin Gordon
(74) *Attorney, Agent, or Firm* — Edell, Shapiro & Finnan, LLC

(57) ABSTRACT

According to one aspect, an autonomous vehicle that includes a lidar unit collects lidar point cloud data that includes false returns or false positives, and characterizes the data associated with the false returns or false positives as drivable or not drivable. The false returns or false positives may be phantom points that are not associated with actual objects which may pose collision risks. Analyzing lidar point cloud data to characterize false returns or false positives as either drivable or not drivable enables an autonomous vehicle to operate efficiently by not having to avoid non-existent collision risks. False positives may be indicated when a wet or icy road surface acts as a mirror which reflects objects, and when precipitation such as raindrops appear as objects. Characterizing such false positives as drivable facilitates the efficient operation of an autonomous vehicle as the autonomous vehicle may drive over a mirror and/or through precipitation.

23 Claims, 12 Drawing Sheets

(56) References Cited

PUBLICATIONS

Goodin, C. et al., MDPI, "Predicting the Influence of Rain on LIDAR in ADAS," Electronics, 2019, vol. 8, 89, Jan. 15, 2019, 9 pages.

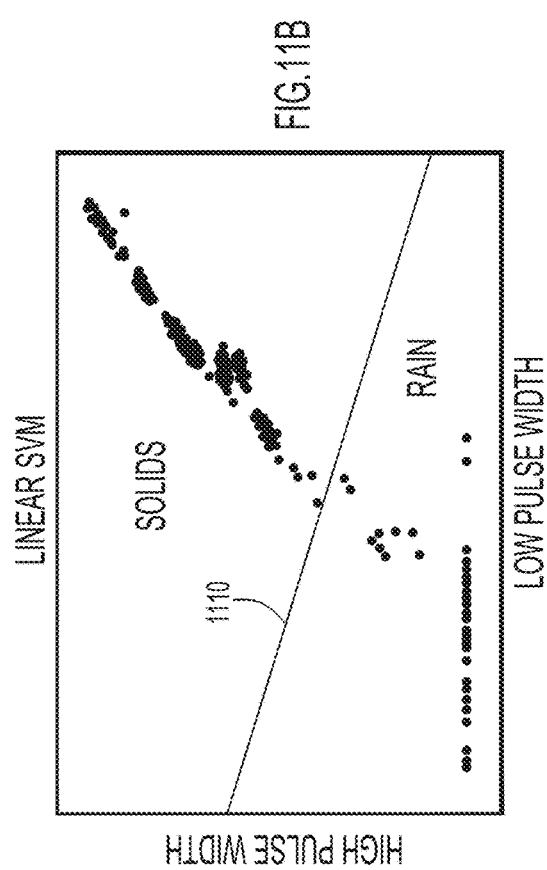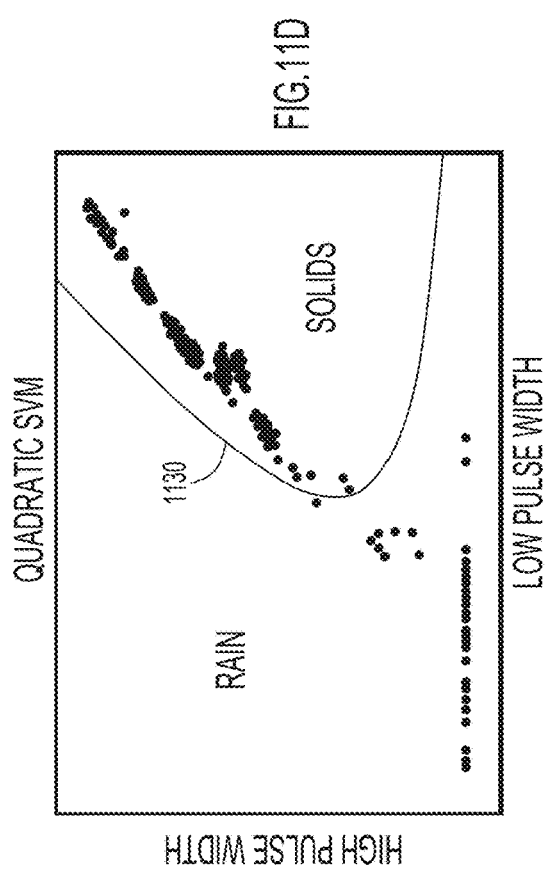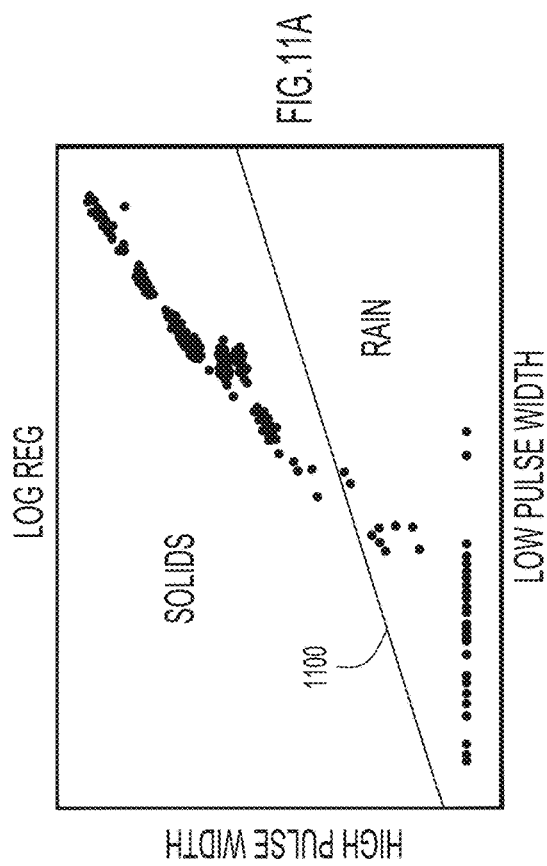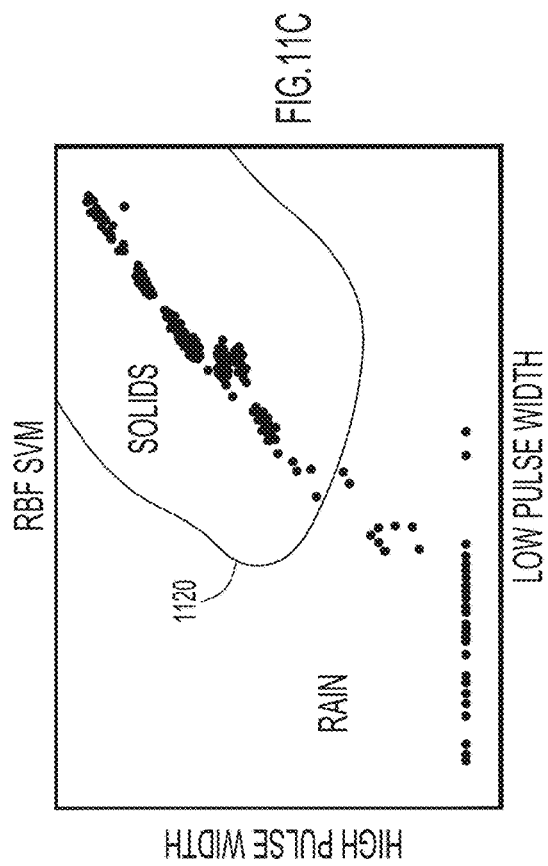

METHODS AND APPARATUS FOR CHARACTERIZING POINT CLOUD DATA FOR AUTONOMOUS VEHICLE SYSTEMS

CROSS REFERENCE TO RELATED APPLICATION

This application claims priority to U.S. Provisional Application No. 63/256,078, filed Oct. 15, 2021, the entirety of which is incorporated herein by reference.

TECHNICAL FIELD

The disclosure relates to providing systems for use in autonomous vehicles. More particularly, the disclosure relates to identifying data in point clouds that may indicate false positives.

BACKGROUND

Autonomous vehicles use sensors to sense objects along the paths on which the autonomous vehicles travel. Using data collected by sensors, a point cloud may be generated that represents shapes of objects in the environment around an autonomous vehicle. At times, a point cloud may include a false return or false positive data which appears to indicate the presence of an object where there in fact is no object. When a false positive indicates the presence of a non-existent object, a vehicle may navigate around the non-existent or perceived object in the interests of safety, e.g., to avoid a collision with the non-existent or perceived object. As a result, the efficiency with which the vehicle navigates may be compromised.

BRIEF DESCRIPTION OF THE DRAWINGS

The disclosure will be readily understood by the following detailed description in conjunction with the accompanying drawings in which:

FIGS. 11A-11D illustrate example point cloud data and decision boundaries displayed over training data of trained models, according to an example embodiment.

DESCRIPTION OF EXAMPLE EMBODIMENTS

General Overview

Figure 1:
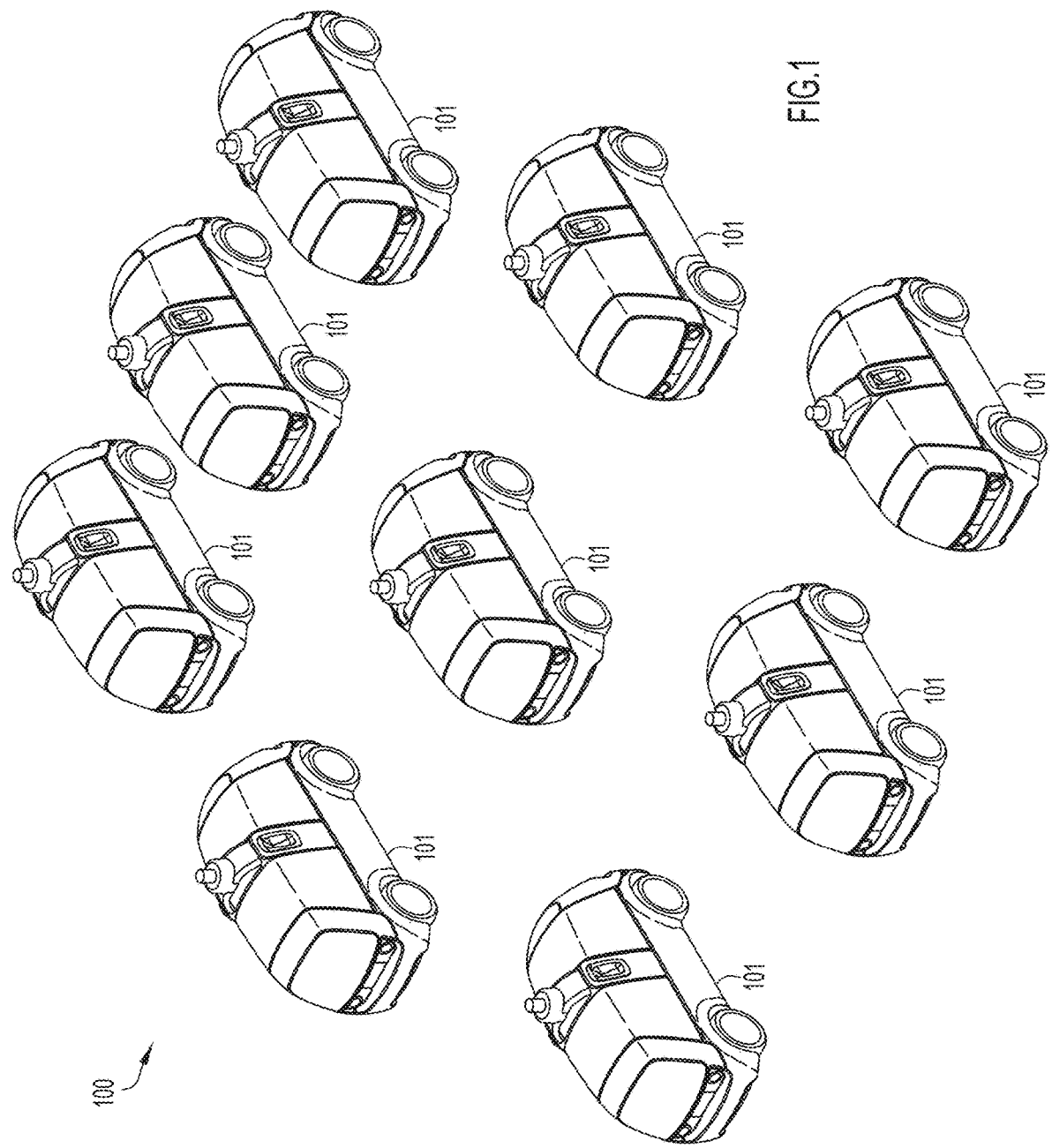
FIG. 1 is a diagrammatic representation of an autonomous vehicle fleet in accordance with an embodiment.

In one embodiment, an autonomous vehicle that includes a lidar sensor system/unit collects lidar point cloud data that includes false returns or false positives, and characterizes the data associated with the false returns or false positives as drivable or not drivable. The false returns or false positives may be phantom points that are not associated with actual objects which may pose collision risks. Analyzing lidar point cloud data to characterize false returns or false positives as either drivable or not drivable enables an autonomous vehicle to operate efficiently by not having to avoid non-existent collision risks. False positives may be indicated when a wet or icy road surface acts as a mirror which reflects objects, and when precipitation such as raindrops appear as objects. Characterizing such false positives as drivable facilitates the efficient operation of an autonomous vehicle as the autonomous vehicle may drive over a mirror and/or through precipitation.

In one form, a method is provided that involves obtaining point cloud data from a lidar sensor system of an autonomous vehicle; and obtaining pulse feature data associated with laser pulses emitted by the lidar sensor system of the autonomous vehicle. The method further includes combining the point cloud data with the pulse feature data to provide overall point cloud data; and analyzing the overall point cloud data to identify potential false positive objects in an environment of the autonomous vehicle. The method includes classifying points in the overall point cloud data as being drivable or non-drivable based on the analyzing to produce classifications for points in the overall point cloud data; and providing the classifications to one or more systems of the autonomous vehicle to control movement of the autonomous vehicle.

DETAILED DESCRIPTION

Lidar units are often used on autonomous vehicles, in addition to other sensors, to effectively sense objects along the paths or routes along which the autonomous vehicles travel. Using data collected by a lidar unit on an autonomous vehicle may be used to generate a three-dimensional point cloud that represents shapes of objects along the path to be travelled by the autonomous vehicle. Some objects that are identified in the point cloud may be misidentified. By way of example, due to reflective surfaces and precipitation, point cloud data may inaccurately indicate the presence of actual objects where there are no actual objects. That is, a point cloud may include a false return or false positive data which appears to indicate the presence of an object where there is no object present. That is, the false returns or false positives may be ghosting points or phantom points. When an autonomous vehicle takes actions to avoid a location where there is purported to be an object, but no object is actually present, the efficiency with which the autonomous vehicle operates is compromised.

By identifying false returns and false positives in point cloud data, an autonomous vehicle may be able to navigate efficiently by either ignoring the false returns and false positives or discarding the false returns and false positives. This improves the data processing operations that the autonomous vehicle may need to perform, and also may avoid unnecessary avoidance maneuvers of the vehicle. In addition to coordinates for data points in a point cloud, additional data may be obtained and stored with the coordinates. The additional data may include data relating to characteristics of laser pulses associated with the data points. Such additional data may be used to ascertain whether data points correspond to actual objects or correspond to false returns and false positives including, but not limited to including, reflective surfaces which reflect actual objects and precipitation. When a reflection of an object is present on a road surface, e.g., when the road surface is wet and is effectively a mirror, and/or when raindrops appear to be objects, a point cloud may indicate the presence of an object where there is none.

The ability to identify data in a point cloud that represents a mirror or precipitation enables an autonomous vehicle to drive efficiently, as the autonomous vehicle may safely drive over the mirror or through the precipitation. By way of example, rather than having to navigate around a mirror surface such as a wet road surface that reflects headlights of another vehicle, the autonomous vehicle may drive over the mirror surface as there is no actual object in the path of the autonomous vehicle.

An autonomous vehicle may be part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
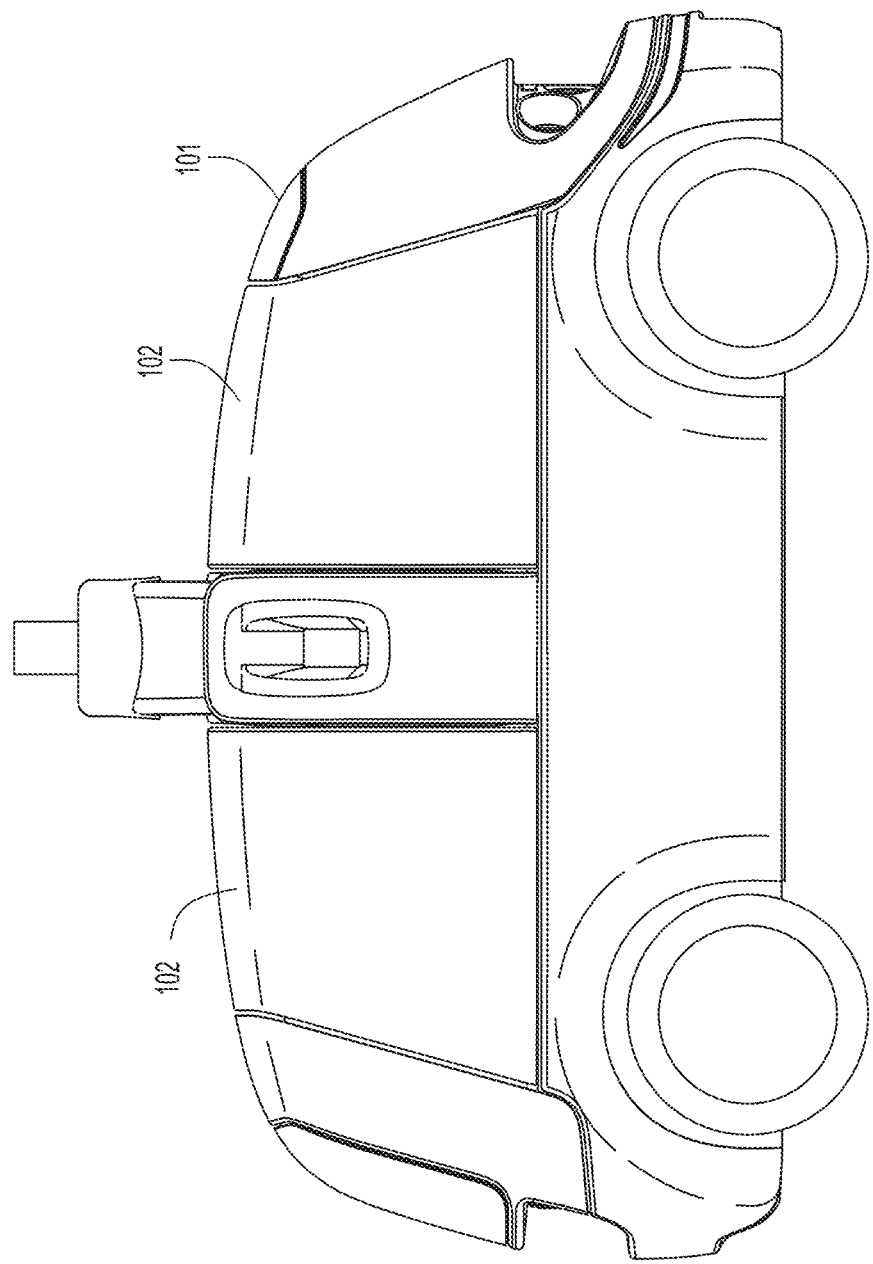
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
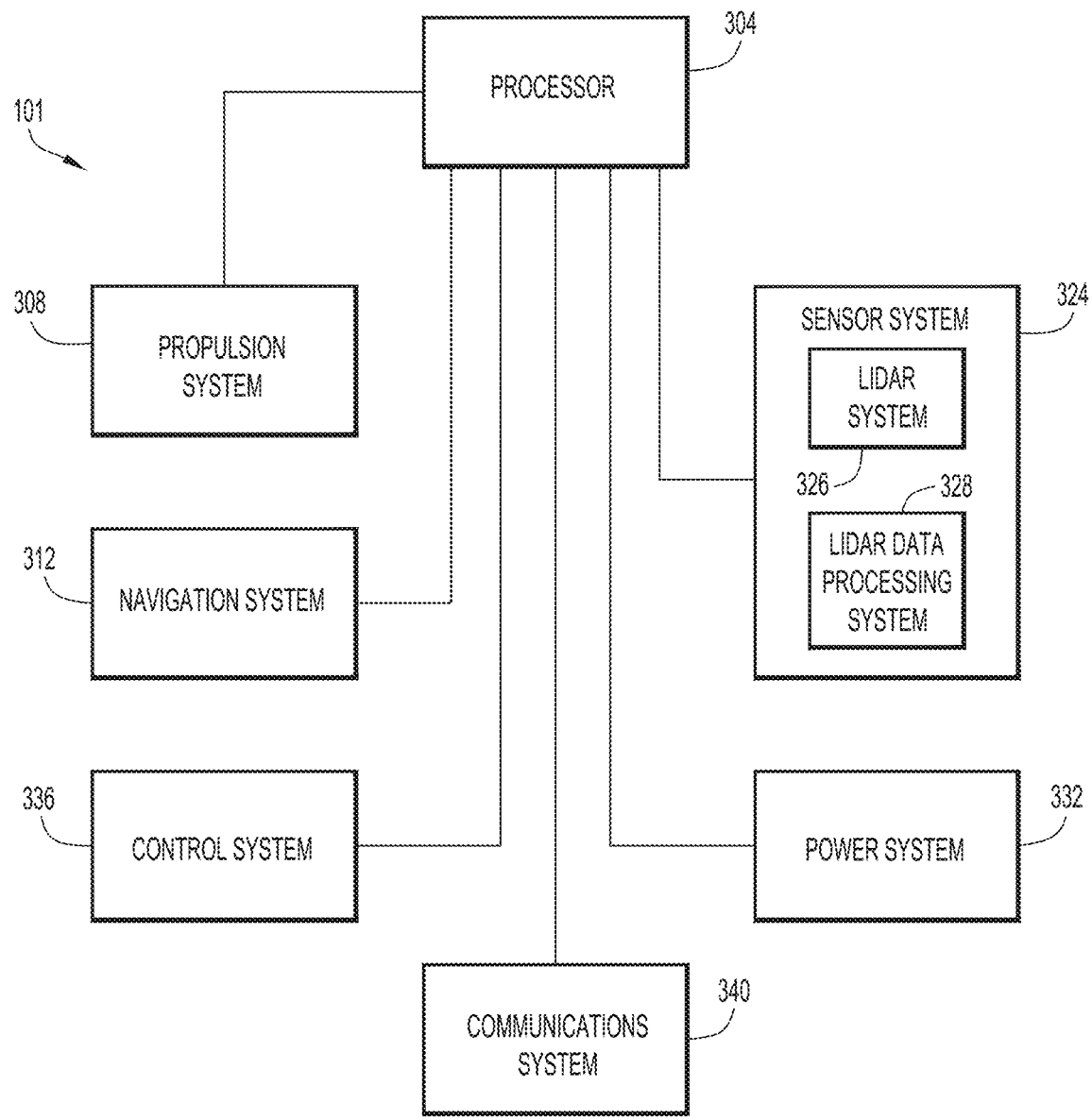
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. As shown, sensor system 324 includes a lidar system 326 and a lidar data processing system 328. Lidar system 326 may include any suitable lidar unit, as for example a time-of-flight lidar unit. Lidar system 326 and lidar data processing system 328 will be discussed below with reference to FIG. 6.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communications system 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Autonomous vehicle 101 may collect data using sensor system 324 which may cause false returns or false positives to be present in a point cloud. Typically, a point cloud may include three dimensional coordinates relating to one or more objects in an environment around autonomous vehicle 101. The coordinates may generally include x-coordinates, y-coordinates, and z-coordinates.

False returns or false positives may result when a road surface is wet, and reflections of objects are classified as objects. For example, a wet road surface (or a roadside object, such as a building window or sign) may in certain conditions, effectively function as a mirror, and when an object is reflected in the mirror, the reflected object may appear to be present as an actual object in the path of the autonomous vehicle. Because autonomous vehicle 101 may drive over a wet surface, (images produced by) a mirror or reflective road surface may effectively be classified as drivable.

False returns or false positives may also result when, for example, precipitation, exhaust, fog, and/or mist appear in a point cloud as objects. As it may generally be possible for autonomous vehicle 101 to drive through precipitation, exhaust, fog, and/or mist, data relating precipitation, exhaust, for, and/or mist may effectively be classified as drivable.

By classifying data points in a point cloud as drivable, an autonomous vehicle may determine whether to drive over or through "objects" corresponding to the data points. For example, when a false return or false positive is essentially identified as not corresponding to an actual object or obstruction in the travel path of the vehicle, a perception system of an autonomous vehicle may determine whether to ignore the data points corresponding to the false return or false positive. The efficiency with which an autonomous vehicle may operate is enhanced when the autonomous vehicle does not have to navigate around phantom objects, or objects which are not actually present, in order to avoid collisions.

Figure 4:
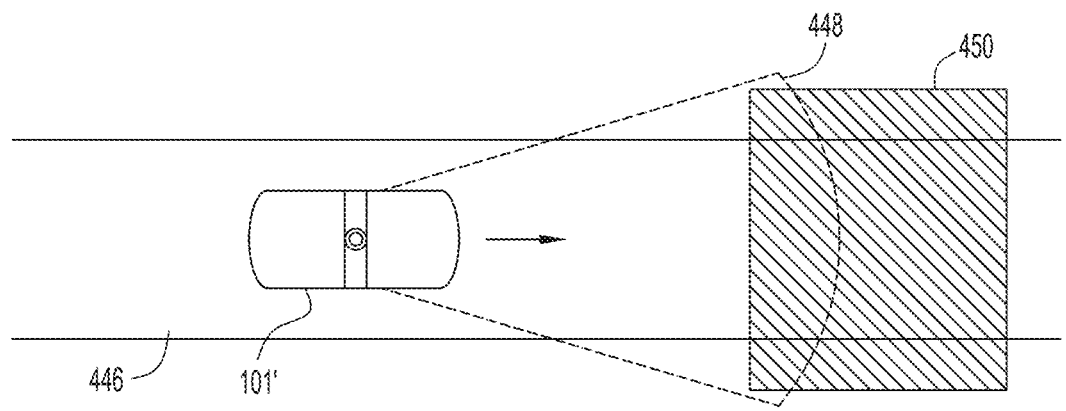
FIG. 4 is a diagrammatic representation of an autonomous vehicle which detects a section of a roadway that appears as a mirrored surface or a reflective surface in accordance with an embodiment.

FIG. 4 is a diagrammatic representation of an autonomous vehicle which detects a section of a roadway that appears as a mirrored surface or a reflective surface in accordance with an embodiment. Autonomous vehicle 101' is travelling on a road surface 446, and has a sensing zone 448 associated with sensors on autonomous vehicle 101'. Sensors sense or otherwise detect a mirrored or reflective surface 450 within sensing zone 448, such as a puddle on the road. Mirrored or reflective surface 450, e.g., a mirror surface, may be the result of a portion of road surface 446 being wet or iced over. That is, mirror surface 450 may be a wet surface or a surface covered with ice. For example, mirror surface 450 may be the result of rain falling and accumulating on a section of road surface 446. A reflection of an object (not shown) on mirror surface 450 may appear in a point cloud, e.g., a point cloud generated by a lidar unit, as a false positive for one or more objects. For example, the reflective surface could be on the roadside, such as windows or mirrors of a building, a sign (stop sign) etc.

Figure 5:
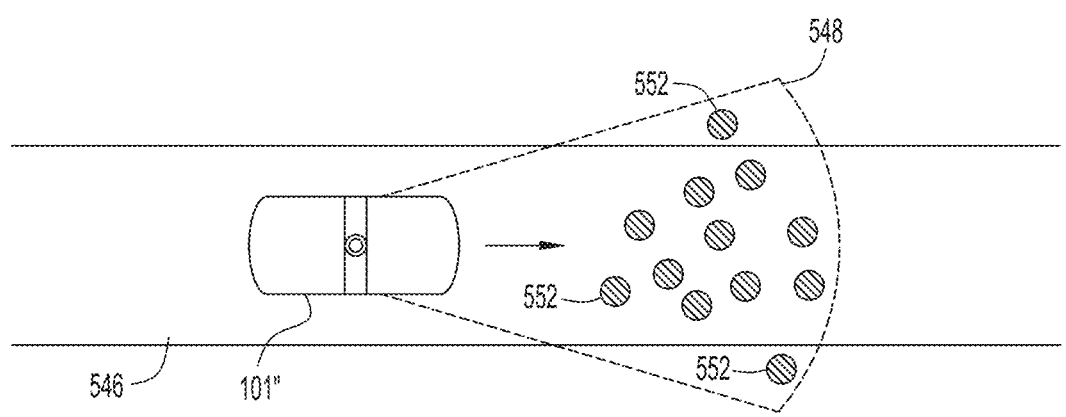
FIG. 5 is a diagrammatic representation of an autonomous vehicle which detects precipitation in accordance with an embodiment.

FIG. 5 is a diagrammatic representation of an autonomous vehicle which detects precipitation or other airborne drivable material in accordance with an embodiment. Autonomous vehicle 101" is travelling on a road surface 546 and precipitation 552, e.g., rain, is detected within a sensing zone 548 associated with sensors on autonomous vehicle 101'. When precipitation 552 is detected, as for example by a lidar unit, coordinates associated with precipitation 552 may appear in a point cloud as false positives for one or more objects. As explained above, instead of precipitation, the airborne drivable material may be fog, mist, smoke or exhaust.

Figure 6:
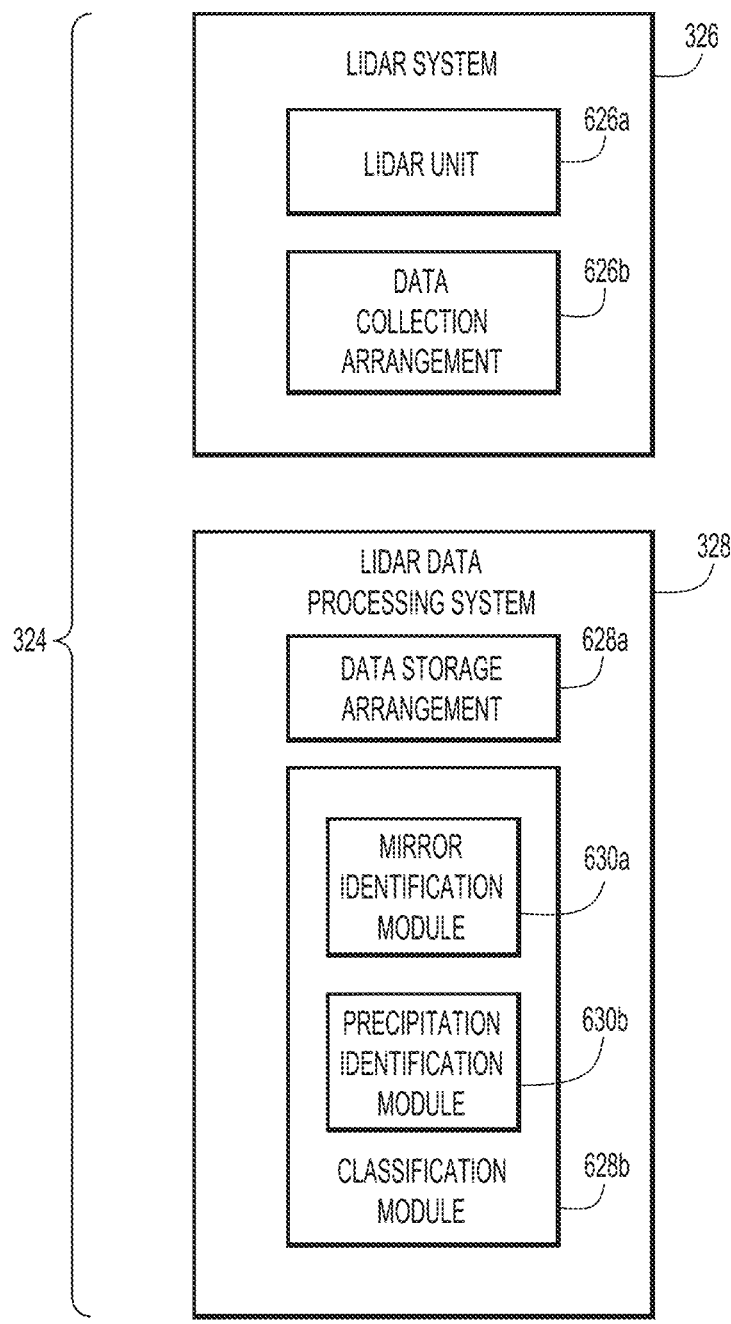
FIG. 6 is a block diagram representation of a sensor system, e.g., sensor system 324 of FIG. 3, in accordance with an embodiment.

Point clouds are typically generated using data collected by lidar units or, more generally, a sensor system on an autonomous vehicle. With reference to FIG. 6, a sensor system, e.g., sensor system 324 of FIG. 3, will be described in accordance with an embodiment. Sensor system 324, as discussed above, includes a lidar system 326 and a lidar data processing system 328. Lidar system 326 may include at least one lidar unit 626a and a data collection arrangement 626b. Lidar data processing system 328 generally includes a data storage arrangement 628a and a classification module 628b.

Lidar system 326 is generally arranged to collect data that may be processed by lidar data processing system 328. Lidar unit 626a may be, but is not limited to being, a time-of-flight lidar unit. Data collection arrangement 626b may collect data which may supplement point cloud data collected by lidar unit 626a. That is, data collection arrangement 626b may collect data which may be substantially combined with three dimensional coordinates obtained using lidar unit 626a to create an overall point cloud which includes information in addition to coordinates. In one embodiment, data collection arrangement 626b may obtain pulse features relating to raw waveforms, and the pulse features may be substantially added to a point cloud generated using lidar unit 626a to create an overall point cloud that includes coordinates and pulse features, e.g., laser pulse features. Pulse features may include, but are not limited to including, thresholds, pulse widths, pulse slope, and/or pulse heights (intensities). As a result, each point in an overall point cloud may include, but is not limited to including, an x-coordinate, a y-coordinate, a z-coordinate, a threshold, a pulse width relative to an x-axis, and a pulse height relative to a y-axis.

Data storage arrangement 628a of lidar data processing system 328 may at least temporarily store data obtained from lidar system 326. In one embodiment, data storage arrangement 628a may be a buffer. Classification module 628b of lidar data processing system 328 is generally arranged to classify data points in an overall point cloud. In one embodiment, classification module 628b may classify or otherwise identify data points as drivable and not drivable, or undrivable. More generally, classification module 628b may effectively identify false returns or false positives, and classify the false returns or false positives as substantially drivable, or not being associated with actual objects which are to be navigated around.

In one embodiment, classification module 628b may use, but is not limited to using, machine learning techniques to ascertain which characteristics are likely to be false returns and false positives. By way of example, classification module 628b may implement a machine learning model that has been trained with ground truths such that the machine learning module may be used to predict or to otherwise ascertain whether data points are associated with false returns or false positives. A further example of a process that includes machine learning techniques for classifying point cloud data is described below in connection with FIG. 10.

In one embodiment, classification module 628b includes a mirror identification module 630a and a precipitation identification module 630b. Mirror identification module 630a is configured to classify or identify whether data contained in an overall point cloud indicates that particular data is associated with a mirrored image or a reflected image, such as depicted in FIG. 4. Such a classification or determination may be made based on factors including, but not limited to including, threshold, pulse widths, and pulse heights. For example, because a mirror or reflective surface generally does not absorb a significant amount of laser energy and relatively strongly reflects a laser, a pulse height associated with a mirror may be relatively low while a pulse width may be substantially the same as a pulse width that is not associated with a mirror. Additionally, data points associated with a mirror may generally be traced to a relatively small area. Mirror identification module 630a may, in some embodiments, use information from sensors such as cameras to facilitate the identification of edges of a mirror and/or radar units to facilitate the identification of a location of the mirror.

Precipitation identification module 630b may generally be configured to determine whether data contained in an overall point cloud indicates that particular data is associated with precipitation or other drivable airborne material (fog, mist, smoke/exhaust, etc.) rather than objects to be avoided (a person, animal or inanimate object), such as depicted in FIG. 5. In general, although precipitation may be rain or rain drops, sleet, hail, and/or snow, it should be understood that precipitation identification module 630b may also be configured to determine whether data is associated with vehicle exhaust, fog, and/or dust. Precipitation identification module 630b may classify or otherwise identify precipitation, e.g., rain drops or droplets, based on characteristics including, but not limited to including, how much laser energy is absorbed and/or reflected by the precipitation, a pulse height, and a pulse width. By way of example, precipitation identification module 630b may identify data points in an overall point cloud as corresponding to rain drops when a pulse height is relatively low or weak and a pulse width is relatively wide compared to pulse heights and widths associated with actual objects. A pulse height associated with a raindrop may be relatively low due to absorption of laser energy, while a pulse width may be relatively wide due to reflection and/or refraction of lasers. Further, precipitation identification module 630b may implement models which account for returns from raindrops appearing to be substantially uniformly distributed in multiple directions. Precipitation identification module 630b may also use data from cameras and radar units to identify blurry images and doppler shifts, respectively, which may generally indicate the presence of precipitation.

Figure 7:
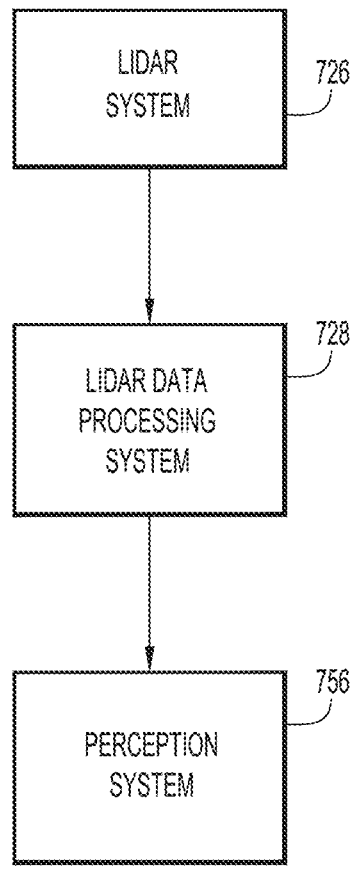
FIG. 7 is a block diagram representation of a flow of data associated with a lidar system in accordance with an embodiment.

FIG. 7 is a block diagram representation of a processing flow of data associated with a lidar system in accordance with an embodiment. A lidar system 726, which may be included in a sensor system of an autonomous vehicle, may collect data relating to the environment around the autonomous vehicle, as for example the environment in a sensing zone or range around the autonomous vehicle. Data collected by lidar system 726 may include coordinates associated with a three dimensional point cloud and additional data, as for example data pertaining to thresholds, pulse heights, and/or pulse widths.

The data collected by lidar system 726 may be provided to a lidar data processing system 728 for processing. Lidar data processing system 728 may identify false returns or false positives in the data, and effectively characterize such false returns or false positives as drivable points. Lidar data processing system 728 may provide information relating to drivable points and non-drivable, or undrivable, points to a perception system 756. Perception system 756, which may be associated with a navigation system of an autonomous vehicle, may determine how to process information relating to drivable points. For example, perception system 756 may essentially determine whether to ignore drivable points, to discard drivable points, and/or to cause the autonomous vehicle to effectively drive through or drive over the drivable points.

Figure 8:
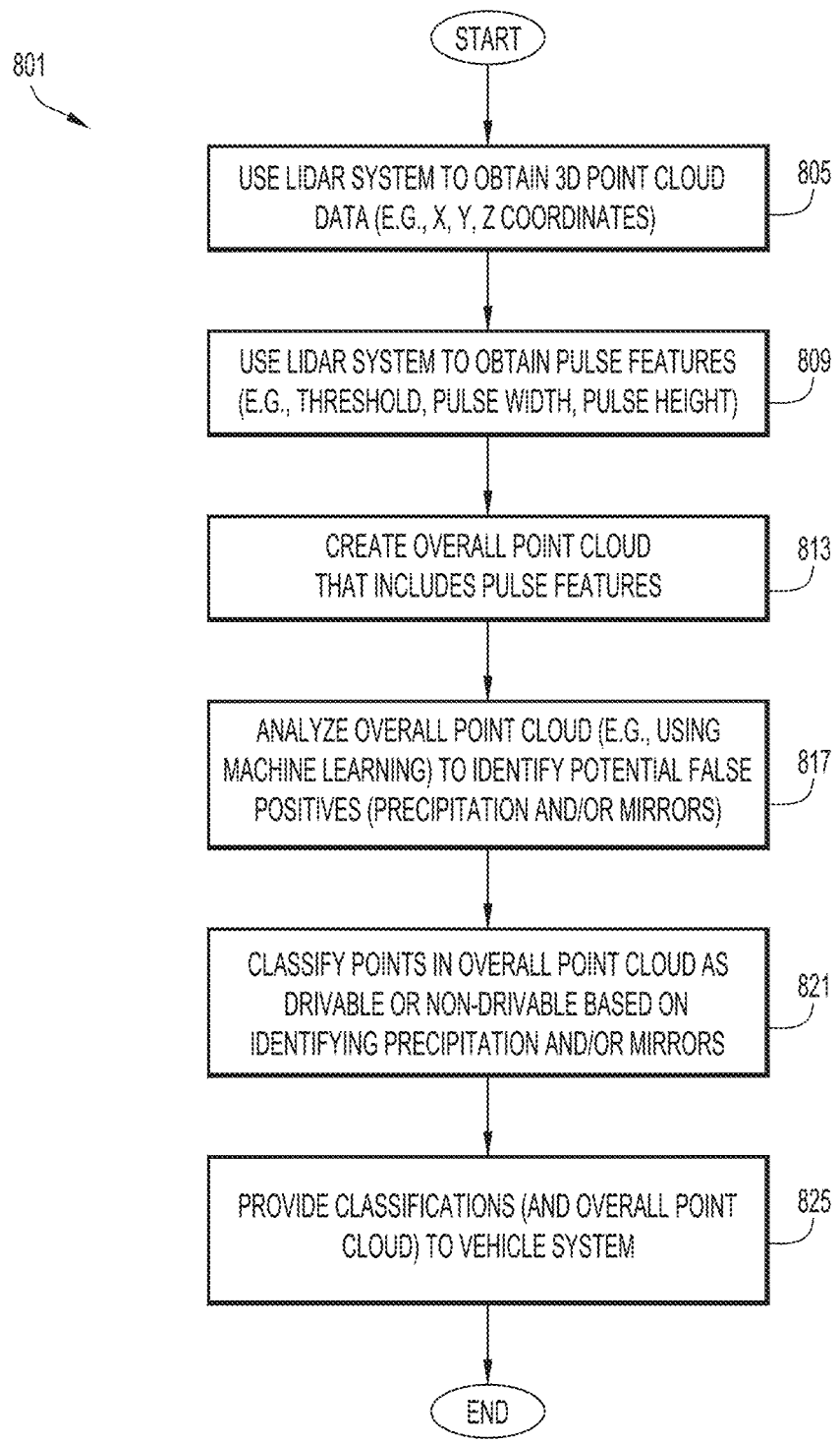
FIG. 8 is a process flow diagram which illustrates a method of processing data associated with a lidar system in accordance with an embodiment.

FIG. 8 is a process flow diagram for a method 801 of processing data associated with a lidar system in accordance with an embodiment, The method 801 of processing data associated with a lidar system begins at a step 805 in which a lidar system of an autonomous vehicle, e.g., an autonomous vehicle such as vehicle 101 of FIGS. 2 and 3, obtains three-dimensional point cloud data. The lidar system may include any suitable lidar unit such as a time-of-flight lidar unit. Three-dimensional point cloud data obtained by the lidar system generally includes, but is not limited to including, x-coordinates, y-coordinates, and z-coordinates that correspond to objects, mirrors, or precipitation effectively detected by the lidar system.

After the three-dimensional point cloud data is obtained, in a step 809, the lidar system is used to obtain pulse features associated with laser pulses emitted by the lidar system. The pulse features may include, but are not limited to, a threshold, a pulse height, and a pulse width. The pulse features may correspond to coordinates obtained by the lidar system in step 805.

In a step 813, an overall point cloud is created that includes the pulse features. The overall point cloud may effectively include the coordinates associated with the three-dimensional point cloud obtained in step 805 and the pulse features obtained in step 809. In other words, points in the overall point cloud generally each include, but are not limited to including, an x-coordinate, a y-coordinate, a z-coordinate, a threshold, a pulse height, and/or a pulse width.

After the overall point cloud is created, in a step 817, the data in the overall point cloud may be analyzed to identify potential false returns or false positives. Such an analysis typically includes identifying data which appear to correspond to objects in an environment around an autonomous vehicle, but may not actually be associated with objects. Any suitable technique may be used to analyze the data including, but not limited to including, machine learning techniques. To facilitate the use of machine learning techniques, sufficient relevant data is collected from the vehicle sensors to for training one or more machine learning models (e.g., neural networks) or classification modules to improve detection capability. Sufficient data is needed to be sure the machine learning algorithms have "seen" the situations (features) in order to accurately classify point cloud data in to identify false positives using those features. A machine learning process is described below in connection with FIG. 10.

From step 817, process flow proceeds to a step 821 in which points in the overall point cloud are classified, e.g., as drivable or non-drivable. The classification of points in the overall point cloud will be discussed below with reference to FIGS. 9A and 9B.

Once the points in the overall point cloud are classified, the classifications and the overall point cloud may be provided to an appropriate vehicle system in a step 825. The classifications and the overall point cloud may be provided to a vehicle system which may use the information. In one embodiment, as discussed above with respect to FIG. 7, the classifications and the overall point cloud may be provided to a perception system of an autonomous vehicle. Upon providing the classifications and the overall point cloud to an appropriate vehicle system, the method 801 of processing data associated with a lidar system is completed.

Figure 9A:
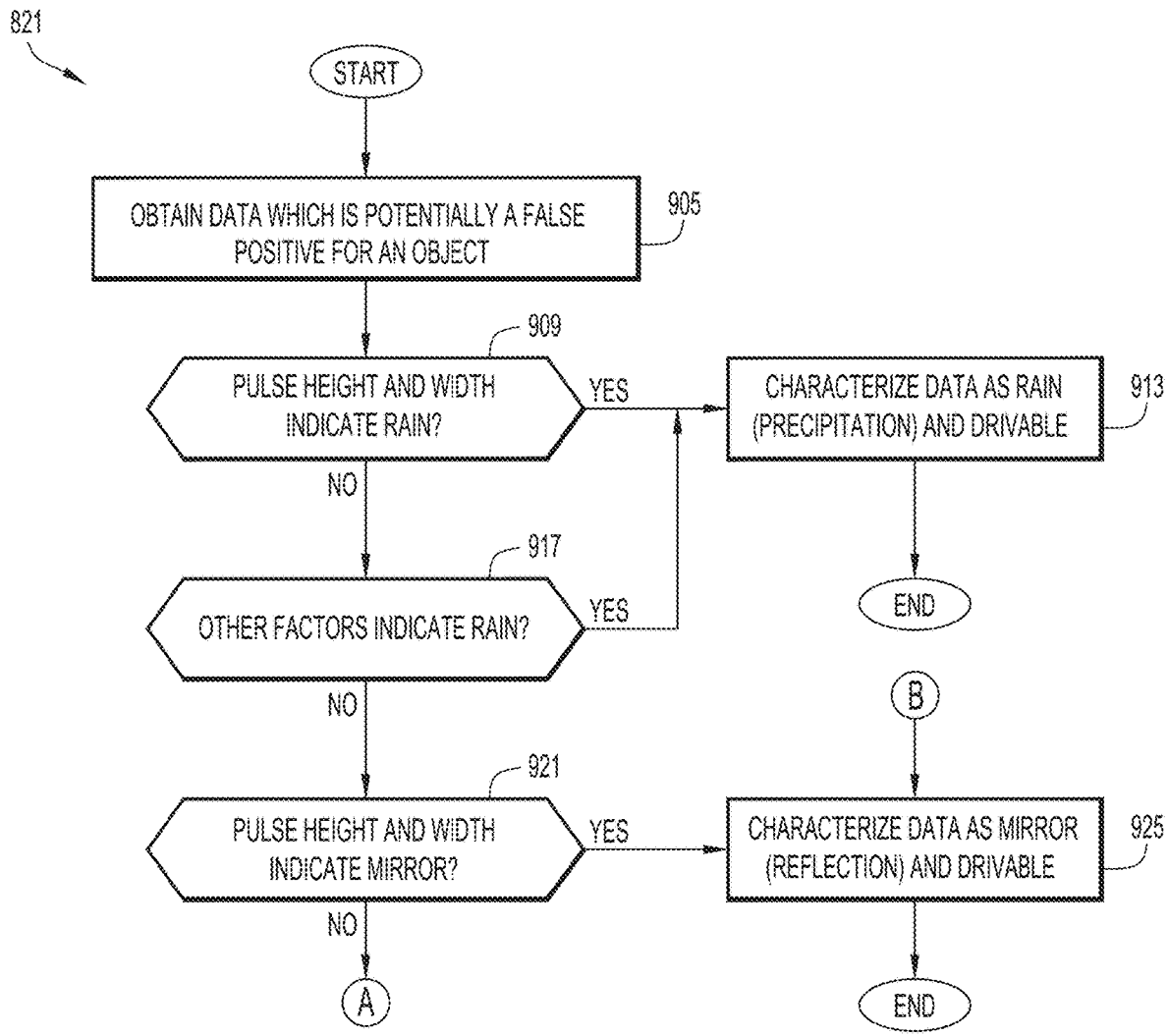
FIGS. 9A and 9B depict process flow diagram which illustrates a method of classifying points in an overall point cloud as part of the method of FIG. 8, in accordance with an embodiment.
Figure 9B:
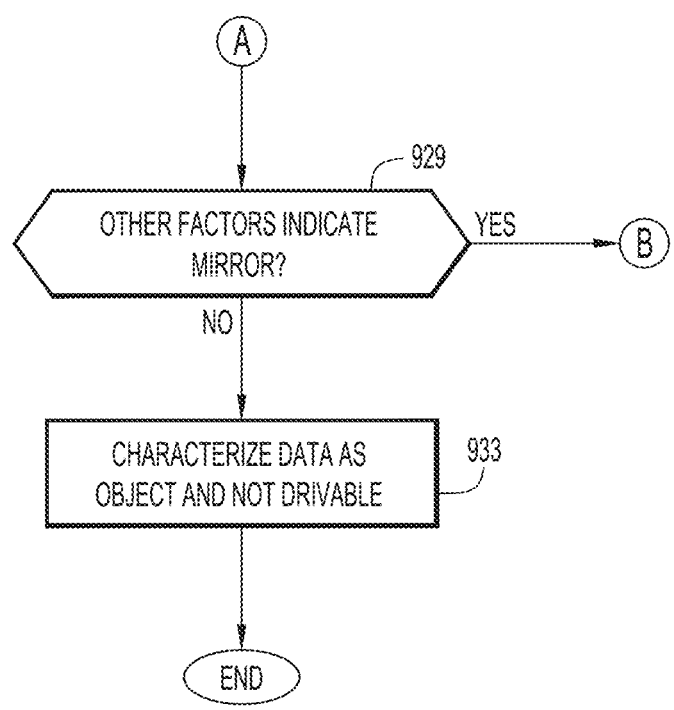

With reference to FIGS. 9A and 9B, a method of classifying points in an overall point cloud, e.g., step 821 of FIG. 8, will be described in accordance with an embodiment. A method of classifying points in an overall point cloud begins at a step 905 in which data which is potentially associated with a false return or a false positive is obtained.

Once the data which is potentially associated with a false return or a false positive is obtained, a determination is made in a step 909 as to whether a pulse height and a pulse width associated with the data indicate that the data corresponds to rain or, more generally, precipitation. If the determination is that the pulse height and the pulse width indicate rain, the data is characterized as being associated with rain or, more generally, precipitation and drivable in a step 913, and the method of classifying points in an overall point cloud is completed.

If the determination in step 909 is that the pulse height and pulse width do not appear to indicate rain, then process flow proceeds to a step 917 in which it is determined whether other factors indicate rain. For example, other factors may include, but are not limited to including, determining where camera images obtained at substantially the same time as the data are indicative of rain. If it is determined that other factors indicate rain, process flow moves to step 913 in which the data is characterized as rain and drivable.

Alternatively, if it is determined in step 917 that other factors do not indicate rain, then in a step 921, a determination is made as to whether the pulse height and pulse width indicate a mirror, or a reflective area on a road surface. If the determination is that the pulse height and pulse width indicate a mirror, then in a step 925, the data is characterized as being associated with a mirror or a reflective surface, and drivable. Once the data is characterized as being associated with a mirror surface and is drivable, the method of classifying points in an overall point cloud is completed.

On the other hand, if the determination in step 921 is that the pulse height and pulse width do not indicate a mirror, then in a step 929, it is determined whether other factors indicate a mirror. Other factors may include, but are not limited to including, a determination of whether substantially all returns associated with an area associated with the data may be traced to a relatively compact area. Factors may also include determining whether data collected over time may indicate the presence of a mirror, as will be discussed below. If it is determined that other factors indicate a mirror, then process flow moves from step 929 to step 925 in which the data is characterized as being associated with a mirror and drivable.

If the determination in step 929 is that other factors do not indicate a mirror, then the data is characterized as being associated with an object and not drivable in a step 933. Characterizing the data as being not drivable, or non-drivable, indicates that the data is associated with an object that may need to be navigated around by a vehicle in order to avoid a collision with the object. After characterizing the data as being not drivable. The method of classifying points in an overall point cloud is completed.

As mentioned above, methods which include collecting data over time may be used to assess whether a mirror is indicated and/or whether precipitation is indicated. To improve the likelihood that a false positive associated with precipitation may be accurately identified, time factors may be considered. For instance, by accumulating multiple frames of images such as images from cameras, or by accumulating data from multiple spins of lidar point clouds, false positive returns associated with precipitation may vary in space as a function of time relative to a vehicle and to a ground. In one embodiment, if a perceived object has a relatively fast changing form factor, that perceived object may be attributed to precipitation. Even for a camera frame rate of approximately thirty Hertz and/or a lidar frame rate of approximately ten Hertz, the movement of a specific raindrop may be approximately 0.1 meters across space within approximately 100 milliseconds, or approximately one revolution period of lidar spinning.

A false positive associated with a perceived object due to a reflective or mirror surface may be perceived by a vehicle as having a consistent motion pattern in space over time. By way of example, when a vehicle is essentially stationary, a perceived object generally also remains substantially stationary in space over time. When a vehicle is moving, a perceived object may be tracked in space over time with a relatively predictable pattern of motion. To better determine the location of a reflective surface relative to a vehicle, sensor fusion may be implemented using a lidar system and a camera system. For example, if the same inverted image is detected (by a camera) at the same area from different angles as the vehicle moves around, this is highly suggestive of a puddle on the road surface that is reflecting the image of some object above the puddle. As another example, if a lidar sensor effectively perceives that there is an area or region on a road surface that shows objects moving consistently with speed, and a camera perceives the area or region as having a relatively clear boundary with respect to an adjacent road surface, the area or region has a relatively high likelihood of being associated with a reflective surface.

It should be understood that the operations of FIGS. 9A and 9B related to characterizing data as precipitation (or other airborne drivable material) or as a mirror image (reflection) may be performed in parallel (substantially simultaneously), rather than in a serial manner as shown in these figures.

Figure 10:
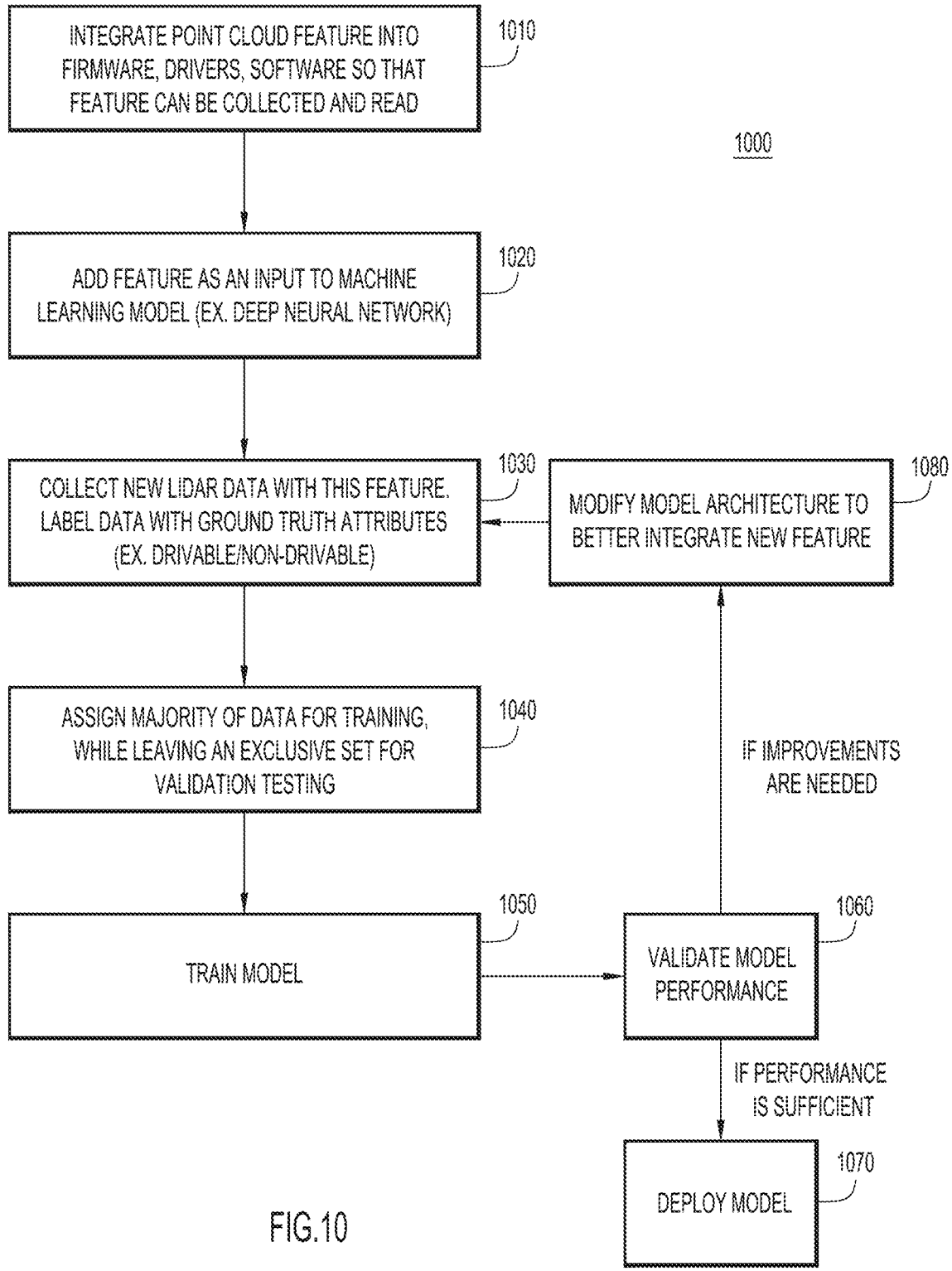
FIG. 10 is a flow chart depicting a machine learning training process used in connection with the techniques presented herein, according to an example embodiment

Reference is now made to FIG. 10. FIG. 10 is a flow chart depicting a machine learning training process 1000, according to an example embodiment. The process 1000 includes several operations that are performed to train one or more machine learning models for analyzing lidar data to distinguish between types of drivable objects and non-drivable objects. At step 1010, data descriptive of point cloud data features is integrated into the firmware, drivers and software that are used to analyze the point cloud data.

At step 1020, a feature is added as an input to a machine learning model. As an example, the machine learning model may be a deep neural network. Examples of such features may include pulse widths, intensity values, or return value (whether it is the closest return from a particular beam). A classification machine learning model can be considered a function that takes in a sequence of numerical inputs and outputs a category or classification. In this sense, adding a feature can mean extending this sequence of numerical inputs to include the new feature.

At step 1030, new lidar data is collected with the feature added at step 1020. The lidar data is labeled with ground truth attributes (drivable/non-drivable). Some (e.g., a majority) of the data may be allocated for training, while an exclusive subset of the data may be allocated for validation testing, as shown in step 1040. For example, the machine learning model may be supervised, and use semantic segmentation labeling. Every point in the point cloud may be given a label that indicates the type of object it is (e.g., precipitation or airborne drivable material, non-solid drivable, or non-drivable object).

At step 1050, the machine learning model is trained with the training data allocated at step 1040. At step 1060, the machine learning model performance is validated with the data allocated for validation testing.

If it is determined, at step 1060, that the model performance is sufficient, then the model may be deployed at step 1070. On the other hand, if it is determined at step 1060 that the model needs improvements, then the process 1000 proceeds to step 1080 where modifications are made to the model architecture to better integrate the new feature. The operations of steps 1030, 1040, 1050, 1060, and 1070 in FIG. 10 can be an iterative procedure, in that once the architecture is fixed and the feature has been integrated, these steps may be repeated continuously as more data is collected, such that performance improvements are achieved, especially for a nascent feature.

As an example, some basic machine learning for lidar point cloud data classification was performed to determine whether the points in the point cloud data are drivable points or not drivable. Models such as logistic regression and support vector machines with several kernels provided promising results when trained on rain and solid full waveform data.

Using a set of full waveforms from both solid object data and rain data (1175 solid, 71 rain), several features were extracted, such as the pulse width, pulse height, average intensity, maximum intensity, and others. With rain labeled as positive samples and solids labeled as negative samples, a randomized 75/25 train/test split was used to optimize the models.

Below is a confusion matrix for a support vector machine (SVM) with quadratic kernel. A confusion matrix is a chart or table that summarizes the performance of a classification model or algorithm for machine learning processes. These are promising results, given the size of data available and simplicity of models used—which lends credence to the capability of using pulse information to classify lidar points as drivable or non-drivable.

Example Confusion Matrix

|  |  | SVM with quadratic kernel Predicted Class | |
|---|---|---|---|
|  |  | Rain | Solid |
| Original Classification | Rain | 0.883 | 0.117 |
|  | Solid | 0 | 1 |

FIGS. 11A-11D illustrate example point cloud data and decision boundaries displayed over training data of trained models. FIG. 11A shows a decision boundary 1100 between rain (or more generally DLOs) and solid based on pulse width for a logistic regression (Log reg) machine learning algorithm, which is one example of a supervised learning technique. FIG. 11B shows a decision boundary 1110 for a linear SVM algorithm. FIG. 11C shows a decision boundary 1120 for a radial basis function (RBF) SVM algorithm. FIG. 11D shows a decision boundary 1130 for a quadratic SVM algorithm The following is a more detailed description of the underlying physics fundamentals by which different materials respond to lidar in different manners, and using lidar pulse information to distinguish objects.

Case (1) solid objects, e.g. cars;

Case (2) drivable lidar objects (DLOs), e.g. rain droplets, exhaust, fog (airborne drivable objects);

Case (3) reflective surfaces, e.g. a puddle on the road after rain, shiny glass windows on buildings.

For case (2) drivable lidar objects, such as rain droplets, the pulse height will be smaller (lower photon energy being received since most light passes through rain droplets) and the pulse width will be larger (the laser pulse gets more dispersed). A droplet in the air intercepts a portion of the laser beam, and refracts/backscatters a smaller amount of energy back to the lidar receiver. In this case, the energy scattered back to the lidar receiver is much lower than that from solid objects, so the pulse height is lower. During the entire process of light-droplet-interaction, there are refractions and pulse dispersions involved, which generally lead to the expansion of pulse waveform, and the pulse width increases accordingly.

For case (3) reflective surfaces, the effect is usually specular reflection of the incident light, which does not alter the shape but does alter the energy of the waveform. The specular reflection is very directional, so the energy received on the lidar receiver is in general very small, unless the lidar happens to be in the right direction of back-reflection.

To summarize, and as captured in the table below, pulse features and the different physics nature of light-materials interactions can be used to distinguish the physical properties of the materials.

|  | Pulse Height | Pulse Width | Other pulse features |
| --- | --- | --- | --- |
| (1) Solid objects | Normal values | Normal values | — |
| (2) DLO, e.g. rain droplets | Smaller | Larger | — |
| (3) Reflective surfaces | Very small | Normal values | — |

Although only a few embodiments have been described in this disclosure, it should be understood that the disclosure may be embodied in many other specific forms without departing from the spirit or the scope of the present disclosure. By way of example, while false returns or false positives have been discussed as being associated with precipitation and mirrors caused by wet road surfaces, false returns or false positives are not limited to be associated with precipitation and mirrors. Other factors which may lead to false returns or false positives include, but are not limited to including, fog, mist, exhaust, dust, and the like. Points in an overall point cloud may be classified as drivable when the points are effectively identified as being associated with fog, mist, exhaust, and/or dust.

In one embodiment, the frequency with which measurements associated with an object that may be false positive object are take may be increased in order to improve the identification of false positives. For example, rather than taking measurements approximately once every 100 milliseconds, encoded pulses may be emitted from or fired from the same laser at a higher frequency such that a potential false positive object may be tracked and located more effectively. Statistically, the differences between precipitation and a reflective surface such as a puddle or standing water on a road surface may be more defined.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 12:
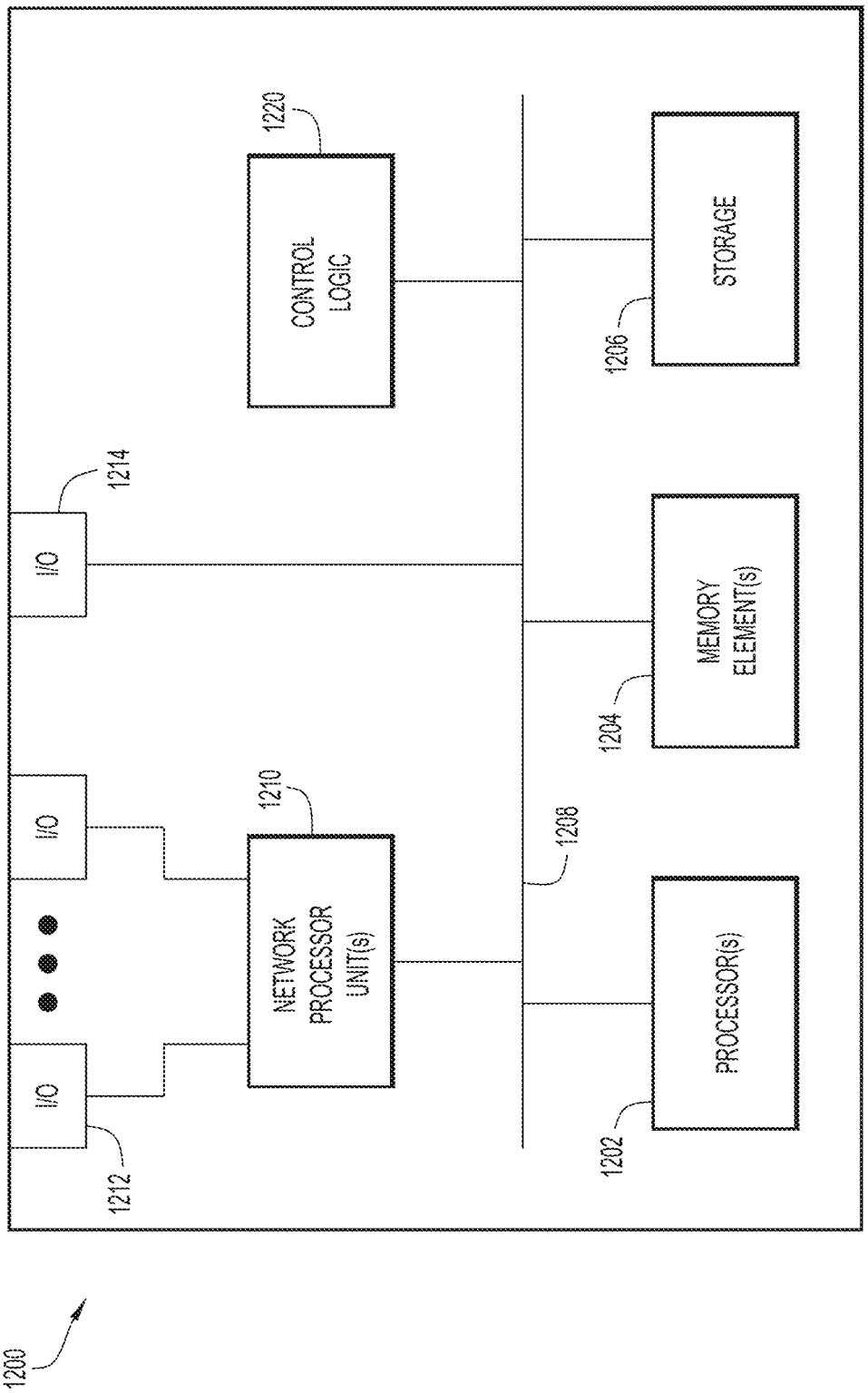
FIG. 12 is a hardware block diagram of a computing device that may be configured to perform any of the operations associated with the techniques presented herein, according to an example embodiment.

Referring now to FIG. 12, FIG. 12 illustrates a hardware block diagram of a computing device 1200 that may perform functions associated with operations discussed herein in connection with the techniques depicted in FIGS. 1-8, 9A, 9B, 10, and 11A-11D. In various embodiments, a computing device or apparatus, such as computing device 1200 or any combination of computing devices 1200, may be configured perform operations of the various techniques discussed herein.

In at least one embodiment, the computing device 1200 may be any apparatus that may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, wireless receivers/transmitters/transceivers, baseband processor(s)/modem(s), and/or other similar network interface driver(s) and/or controller(s) now known or hereafter developed to enable communications between computing device 1200 and other systems, autonomous vehicle sub-systems, etc. to facilitate operations for various embodiments described herein. In various embodiments, network I/O interface(s) 1212 can be configured as one or more Ethernet port(s), any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other autonomous vehicle sub-systems that may be connected to computing device 1200. For example, I/O interface(s) 1214 may provide a connection to external devices, and/or any other suitable input and/or output device now known or hereafter developed.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

In some aspects, the techniques described herein relate to a method including: obtaining point cloud data from a lidar sensor system of an autonomous vehicle; obtaining pulse feature data associated with laser pulses emitted by the lidar sensor system of the autonomous vehicle; combining the point cloud data with the pulse feature data to provide overall point cloud data; analyzing the overall point cloud data to identify potential false positive objects in an environment of the autonomous vehicle; classifying points in the overall point cloud data as being drivable or non-drivable based on the analyzing to produce classifications for points in the overall point cloud data; and providing the classifications to one or more systems of the autonomous vehicle to control movement of the autonomous vehicle.

In some aspects, the techniques described herein relate to a method, wherein classifying includes, for points in the overall point cloud data that are associated with a potential false positive object includes analyzing the overall point cloud data to determine whether the points are drivable points associated with airborne drivable material or a reflective surface; and the method further includes: determining whether to ignore drivable points in the overall point cloud data, discard drivable points in the overall point cloud data, and/or to cause the autonomous vehicle to effectively drive through or drive over the drivable points.

In some aspects, the techniques described herein relate to a method, wherein analyzing includes analyzing the overall point cloud data to detect variations in the overall point cloud data in space as a function of time that is indicative of precipitation airborne drivable material.

In some aspects, the techniques described herein relate to a method, wherein analyzing includes analyzing the overall point cloud data over time as the autonomous vehicle is moving to detect a consistent motion pattern in space of a perceived object that is indicative of a reflective surface.

In some aspects, the techniques described herein relate to a method, wherein analyzing includes: determining whether a pulse height and a pulse width of the pulse feature data for points associated with a potential false positive object are consistent with an airborne drivable material or object or are consistent with a reflective surface.

In some aspects, the techniques described herein relate to a method, wherein analyzing is based further on other sensor data obtain from one or more sensors of the autonomous vehicle other than the lidar sensor system, including camera image data.

In some aspects, the techniques described herein relate to a method, wherein analyzing includes analyzing the camera image data obtained at substantially the same time as the overall point cloud data.

In some aspects, the techniques described herein relate to a method, wherein analyzing includes analyzing camera image data obtained over time at different angles as the autonomous vehicle is moving.

In some aspects, the techniques described herein relate to a method, wherein classifying includes classifying points in the overall point cloud data as being non-drivable when the points are not classified as being associated with an airborne drivable material or associated with an image associated with a reflective surface.

In some aspects, the techniques described herein relate to a method, wherein classifying is performed using on one or more machine learning models.

In some aspects, the techniques described herein relate to an apparatus including: a lidar sensor system configured to provide point cloud data for an autonomous vehicle; and a lidar data processing system coupled to the lidar sensor system, and configured to perform operations including: generating pulse feature data associated with laser pulses emitted by the lidar sensor system; combining the point cloud data with the pulse feature data to provide overall point cloud data; analyzing the overall point cloud data to identify potential false positive objects in an environment of the autonomous vehicle; classifying points in the overall point cloud data as being drivable or non-drivable based on the analyzing to produce classifications for points in the overall point cloud data; and providing the classifications to one or more systems of the autonomous vehicle to control movement of the autonomous vehicle.

In some aspects, the techniques described herein relate to an apparatus, wherein the lidar data processing system is configured to perform the classifying by, for points in the overall point cloud data that are associated with a potential false positive object: analyzing the overall point cloud data to determine whether the points are drivable points associated with airborne drivable material or a reflective surface.

In some aspects, the techniques described herein relate to an apparatus, wherein the lidar data processing system is configured to perform the analyzing by analyzing the overall point cloud data to detect variations in the overall point cloud data in space as a function of time that is indicative of precipitation airborne drivable material.

In some aspects, the techniques described herein relate to an apparatus, wherein the lidar data processing system is configured to perform the analyzing by analyzing the overall point cloud data over time as the autonomous vehicle is moving to detect a consistent motion pattern in space of a perceived object that is indicative of a reflective surface.

In some aspects, the techniques described herein relate to an apparatus, wherein the lidar data processing system is configured to perform the analyzing by determining whether a pulse height and a pulse width of the pulse feature data for points associated with a potential false positive object are consistent with an airborne drivable material or object or are consistent with a reflective surface.

In some aspects, the techniques described herein relate to an apparatus, wherein the lidar data processing system performs the analyzing based further on other sensor data obtain from one or more sensors of the autonomous vehicle other than the lidar sensor system, including camera image data.

In some aspects, the techniques described herein relate to an apparatus, further including: a perception system coupled to the lidar data processing system, wherein the perception system is configured to provide input to a navigation system of the autonomous vehicle determine whether to ignore drivable points in the overall point cloud data, discard drivable points in the overall point cloud data, and/or to cause the autonomous vehicle to effectively drive through or drive over the drivable points.

In some aspects, the techniques described herein relate to one or more non-transitory computer readable storage media encoded with software instructions that, when executed by one or more processors, cause the one or more processors to perform operations including: obtaining point cloud data from a lidar sensor system of an autonomous vehicle; obtaining pulse feature data associated with laser pulses emitted by the lidar sensor system of the autonomous vehicle; combining the point cloud data with the pulse feature data to provide overall point cloud data; analyzing the overall point cloud data to identify potential false positive objects in an environment of the autonomous vehicle; classifying points in the overall point cloud data as being drivable or non-drivable based on the analyzing to produce classifications for points in the overall point cloud data; and providing the classifications to one or more systems of the autonomous vehicle to control movement of the autonomous vehicle.

In some aspects, the techniques described herein relate to one or more non-transitory computer readable storage media, wherein classifying includes, for points in the overall point cloud data that are associated with a potential false positive object includes analyzing the overall point cloud data to determine whether the points are drivable points associated with airborne drivable material or a reflective surface; and further including software instructions that, when executed by the one or more processors, cause the one or more processors to perform: determining whether to ignore drivable points in the overall point cloud data, discard drivable points in the overall point cloud data, and/or to cause the autonomous vehicle to effectively drive through or drive over the drivable points.

In some aspects, the techniques described herein relate to one or more non-transitory computer readable storage media, wherein analyzing includes analyzing the overall point cloud data to detect variations in the overall point cloud data in space as a function of time that is indicative of precipitation airborne drivable material.

In some aspects, the techniques described herein relate to one or more non-transitory computer readable storage media, wherein analyzing includes: determining whether a pulse height and a pulse width of the pulse feature data for points associated with a potential false positive object are consistent with an airborne drivable material or object or are consistent with a reflective surface.

In some aspects, the techniques described herein relate to one or more non-transitory computer readable storage media, wherein analyzing is based further on other sensor data obtain from one or more sensors of the autonomous vehicle other than the lidar sensor system, including camera image data.

In some aspects, the techniques described herein relate to one or more non-transitory computer readable storage media, wherein analyzing includes analyzing the camera image data obtained at substantially the same time as the overall point cloud data. Methods and Apparatus for Characterizing Point Cloud Data for Autonomous Vehicle Systems Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
   obtaining point cloud data from a lidar sensor system of an autonomous vehicle;
   obtaining pulse feature data associated with laser pulses emitted by the lidar sensor system of the autonomous vehicle;
   combining the point cloud data with the pulse feature data to provide overall point cloud data;
   analyzing the overall point cloud data to identify potential false positive objects in an environment of the autonomous vehicle;

classifying points in the overall point cloud data as being drivable or non-drivable based on the analyzing to produce classifications for points in the overall point cloud data; and providing the classifications to one or more systems of the autonomous vehicle to control movement of the autonomous vehicle.

2. The method of claim 1, wherein classifying comprises, for points in the overall point cloud data that are associated with a potential false positive object comprises analyzing the overall point cloud data to determine whether the points are drivable points associated with airborne drivable material or a reflective surface; and the method further comprises:

determining whether to ignore drivable points in the overall point cloud data, discard drivable points in the overall point cloud data, and/or to cause the autonomous vehicle to effectively drive through or drive over the drivable points.

3. The method of claim 2, wherein analyzing comprises analyzing the overall point cloud data to detect variations in the overall point cloud data in space as a function of time that is indicative of precipitation airborne drivable material.

4. The method of claim 2, wherein analyzing comprises analyzing the overall point cloud data over time as the autonomous vehicle is moving to detect a consistent motion pattern in space of a perceived object that is indicative of a reflective surface.

5. The method of claim 2, wherein analyzing comprises:

determining whether a pulse height and a pulse width of the pulse feature data for points associated with a potential false positive object are consistent with an airborne drivable material or object or are consistent with a reflective surface.

6. The method of claim 5, wherein analyzing is based further on other sensor data obtain from one or more sensors of the autonomous vehicle other than the lidar sensor system, including camera image data.

7. The method of claim 6, wherein analyzing includes analyzing the camera image data obtained at substantially the same time as the overall point cloud data.

8. The method of claim 6, wherein analyzing includes analyzing camera image data obtained over time at different angles as the autonomous vehicle is moving.

9. The method of claim 2, wherein classifying comprises classifying points in the overall point cloud data as being non-drivable when the points are not classified as being associated with an airborne drivable material or associated with an image associated with a reflective surface.

10. The method of claim 1, wherein classifying is performed using on one or more machine learning models.

11. An apparatus comprising:

a lidar sensor system configured to provide point cloud data for an autonomous vehicle; and a lidar data processing system coupled to the lidar sensor system, and configured to perform operations including:

generating pulse feature data associated with laser pulses emitted by the lidar sensor system;

combining the point cloud data with the pulse feature data to provide overall point cloud data;

analyzing the overall point cloud data to identify potential false positive objects in an environment of the autonomous vehicle;

classifying points in the overall point cloud data as being drivable or non-drivable based on the analyzing to produce classifications for points in the overall point cloud data; and providing the classifications to one or more systems of the autonomous vehicle to control movement of the autonomous vehicle.

12. The apparatus of claim 11, wherein the lidar data processing system is configured to perform the classifying by, for points in the overall point cloud data that are associated with a potential false positive object:

analyzing the overall point cloud data to determine whether the points are drivable points associated with airborne drivable material or a reflective surface.

13. The apparatus of claim 12, wherein the lidar data processing system is configured to perform the analyzing by analyzing the overall point cloud data to detect variations in the overall point cloud data in space as a function of time that is indicative of precipitation airborne drivable material.

14. The apparatus of claim 12, wherein the lidar data processing system is configured to perform the analyzing by analyzing the overall point cloud data over time as the autonomous vehicle is moving to detect a consistent motion pattern in space of a perceived object that is indicative of a reflective surface.

15. The apparatus of claim 12, wherein the lidar data processing system is configured to perform the analyzing by determining whether a pulse height and a pulse width of the pulse feature data for points associated with a potential false positive object are consistent with an airborne drivable material or object or are consistent with a reflective surface.

16. The apparatus of claim 15, wherein the lidar data processing system performs the analyzing based further on other sensor data obtain from one or more sensors of the autonomous vehicle other than the lidar sensor system, including camera image data.

17. The apparatus of claim 12, further comprising:

a perception system coupled to the lidar data processing system, wherein the perception system is configured to provide input to a navigation system of the autonomous vehicle determine whether to ignore drivable points in the overall point cloud data, discard drivable points in the overall point cloud data, and/or to cause the autonomous vehicle to effectively drive through or drive over the drivable points.

18. One or more non-transitory computer readable storage media encoded with software instructions that, when executed by one or more processors, cause the one or more processors to perform operations including:

obtaining point cloud data from a lidar sensor system of an autonomous vehicle;

obtaining pulse feature data associated with laser pulses emitted by the lidar sensor system of the autonomous vehicle;

combining the point cloud data with the pulse feature data to provide overall point cloud data;

analyzing the overall point cloud data to identify potential false positive objects in an environment of the autonomous vehicle;

classifying points in the overall point cloud data as being drivable or non-drivable based on the analyzing to produce classifications for points in the overall point cloud data; and providing the classifications to one or more systems of the autonomous vehicle to control movement of the autonomous vehicle.

19. The one or more non-transitory computer readable storage media of claim 18, wherein classifying comprises, for points in the overall point cloud data that are associated with a potential false positive object comprises analyzing the overall point cloud data to determine whether the points are drivable points associated with airborne drivable material or a reflective surface; and further comprising software instructions that, when executed by the one or more processors, cause the one or more processors to perform:

determining whether to ignore drivable points in the overall point cloud data, discard drivable points in the overall point cloud data, and/or to cause the autonomous vehicle to effectively drive through or drive over the drivable points.

20. The one or more non-transitory computer readable storage media of claim 19, wherein analyzing comprises analyzing the overall point cloud data to detect variations in the overall point cloud data in space as a function of time that is indicative of precipitation airborne drivable material.

21. The one or more non-transitory computer readable storage media of claim 20, wherein analyzing comprises:

determining whether a pulse height and a pulse width of the pulse feature data for points associated with a potential false positive object are consistent with an airborne drivable material or object or are consistent with a reflective surface.

22. The one or more non-transitory computer readable storage media of claim 21, wherein analyzing is based further on other sensor data obtain from one or more sensors of the autonomous vehicle other than the lidar sensor system, including camera image data.

23. The one or more non-transitory computer readable storage media of claim 22, wherein analyzing includes analyzing the camera image data obtained at substantially the same time as the overall point cloud data.

* * * * *